United States Patent [19]

Sato et al.

[11] Patent Number: 4,502,831
[45] Date of Patent: Mar. 5, 1985

[54] METHOD OF CONTROLLING OPERATION OF MULTISTAGE HYDRAULIC MACHINES

[75] Inventors: Shinsaku Sato, Ebina; Ichiro Yamagata, Yokohama, both of Japan

[73] Assignee: Tokyo Shibaura Denki Kabushiki Kaisha, Kanagawa, Japan

[21] Appl. No.: 456,974

[22] Filed: Jan. 10, 1983

[30] Foreign Application Priority Data

Jan. 14, 1982 [JP] Japan ................................. 57-4398
Jan. 14, 1982 [JP] Japan ................................. 57-4399
Feb. 10, 1982 [JP] Japan ............................... 57-20158
Feb. 15, 1982 [JP] Japan ............................... 57-22384
Feb. 15, 1982 [JP] Japan ............................... 57-22385

[51] Int. Cl.³ .................... F01D 17/00; F01D 17/04; F01D 17/06; F01D 17/08
[52] U.S. Cl. ........................................ 415/1; 415/29; 415/17; 415/500; 415/26; 415/50; 415/146; 415/162
[58] Field of Search ............... 415/1, 500, 29, 26, 415/17, 47, 50, 146, 147, 159, 162, 112

[56] References Cited

U.S. PATENT DOCUMENTS 3,960,463  6/1976  Okada et al. .......................... 415/1
4,014,624  3/1977  Takase et al. ....................... 415/500
4,236,867 12/1980  Morris ................................ 415/112
4,255,078  3/1981  Tsunoda et al. ....................... 415/1
4,280,788  7/1981  Tsunoda et al. ....................... 415/1
4,346,304  8/1982  Tsunoda et al. ....................... 415/1
4,412,779 11/1983  Tsunoda et al. ....................... 415/1
4,431,370  2/1984  Ichikawa et al. ................... 415/112

FOREIGN PATENT DOCUMENTS 2920760   6/1979  Fed. Rep. of Germany ...... 415/500
54-108143  8/1979  Japan ................................. 415/1
54-114647  9/1979  Japan ................................. 415/1
54-114650  9/1979  Japan ................................. 415/1

Primary Examiner—Samuel Scott
Assistant Examiner—Brian J. Bowman
Attorney, Agent, or Firm—Stevens, Davis, Miller & Mosher

[57] ABSTRACT

A multistage hydraulic machine in which respective pressure stages are connected in series through return passages and the highest and lowest pressure stages are provided with movable guide vanes the degrees of openings of which are variable is controlled in load adjustment or in response to the change of a static head under a steady operation condition by controlling the degrees of openings of the movable guide vanes of the highest and lowest pressure stages in accordance with several modes.

22 Claims, 18 Drawing Figures

METHOD OF CONTROLLING OPERATION OF MULTISTAGE HYDRAULIC MACHINES

BACKGROUND OF THE INVENTION

This invention relates to a method for controlling operation of a multistage hydraulic machine, and more particularly, a method for controlling and adjusting a load or water level in a steady operating condition of a multistage hydraulic machine in which all pressure stages are interconnected through return passages and the highest and lowest pressure stages are provided with movable guide vanes.

In a known hydraulic machine, operation or running condition thereof was controlled by adjusting water flow amount passing through a runner, this adjustment being done by guide vanes provided on the periphery of the runner or by an inlet valve located at an inlet portion of the hydraulic machine. Regarding the known multistage hydraulic machine in which respective pressure stages are provided with runners connected through return passages respectively, there have been proposed several methods for controlling water flow conditions at the respective stages by guide vanes located on the peripheries of the runners of the stages thereby to control the operation of the hydraulic machines. However, with the multistage hydraulic machines of the type described above, it is extremely difficult because of constructional limitation to provide guide vanes on the outer peripheries of the runners of the corresponding stages and to control the opening or closing of the guide vanes by a guide vane control unit which is connected to the guide vanes, which provides a problem for practical use of the multistage hydraulic machine.

In the other controlling method in which only stationary guide vanes having a constant degree of opening is usually located on the outer peripheral surface of a runner of each pressure stage and the adjustment of the water flow amount and the machine operation control are performed by open-close control of the inlet valve provided at an inlet portion of the hydraulic machine. However, in this method, the water flow condition at the periphery of the runner of each stage cannot be properly adjusted in response to the flow amount of water passing therethrough, so that in low and high flow-rate ranges apart from design points, hydraulic performance lowers and the hydraulic machine is operated under lowered overall hydraulic performance.

In order to obviate defects or problems described above, there has also been proposed a method for controlling operation of a multistage hydraulic machine, in which movable guide vanes are provided only for the highest pressure stage and the flow amount of water can be adjusted by regulating the degree of opening of the movable guide vanes. According to this operation control method, the water head loss at the inlet valve which is observed in a case where no movable guide vanes are arranged at the highest pressure stage was not observed, so that this control method has more excellent operation efficiency than the first mentioned method. However, regardless of such advantages as described above, in the later mentioned method, since the lowest pressure stage is operated at an operation point largely apart from a designed operating point during operation with a small amount of water, water separation phenomenon and/or secondary local flow may often occur, and these adverse phenomena are often observed as water pressure on the outlet side of a runner lowers, so that there are such problems as that the water separation phenomenon and the secondary local flow increases at the lowest pressure stage where the water pressure on the outlet side of the runner of this stage is lower than those of the other stages, and the hydraulic machine of this type is operated under an unstable condition causing cavitation, strong vibrations and noises.

Accordingly, it has been considered to construct a multistage hydraulic machine provided with movable guide vanes for the highest and lowest pressure stages as an ideal multistage hydraulic machine having reasonable structure and relatively high hydraulic operation performance.

With the actual operation control for running the multistage hydraulic machine in which the highest and lowest pressure stages are provided with the movable guide vanes, in consideration of the load or water level adjustment control at the steady operation, the multistage hydraulic machine of this type has a complicated flow passage in comparison with a single-stage hydraulic machine and it is necessary to accurately operate or control movable guide vanes of the highest and lowest pressure stages. Moreover, in a case where the control of the movable guide vanes is not accurately performed, head ratio or distribution on the runners of the respective stages becomes non-uniform, which may cause the lowering of the hydraulic performance of the machine and generate cavitation, vibration and noises at the lowest pressure stage.

SUMMARY OF THE INVENTION

An object of this invention is to provide a method of controlling operation of a multistage hydraulic machine in which load adjustment under a steady operation condition can be done by controlling degrees of openings of movable guide vanes of the highest and lowest pressure stages.

Another object of this invention is to provide a method of controlling operation of a multistage hydraulic machine in which water level adjustment in response to the change of static head under a steady operation condition is made by controlling degrees of openings of movable guide vanes of the highest and lowest pressure stages.

A further object of this invention is to provide a method of controlling degrees of openings of the movable guide vanes of the highest and lowest pressure stages to thereby prevent generation of cavitation, vibration, and noises and prevent abnormal pressure rising at the lowest pressure stage.

According to this invention in one aspect thereof, there is provided a method of controlling operation of a multistage hydraulic machine under a steady operation condition thereof in which respective pressure stages are connected in series through runners and return passages and the highest and lowest pressure stages are provided with movable guide vanes the degrees of openings of which are variable, the method comprising the steps of controlling the degree of opening of the movable guide vanes of one of the highest and lowest pressure stages in accordance with control instructions regarding the load and controlling the degree of opening of the movable guide vanes of the other one of the highest and lowest pressure stages in accordance with control instructions regarding hydraulic pressure difference between a pressure at a portion between the highest and lowest pressure stages and a pressure at a portion outside of one of the highest and lowest pressure stages.

In another aspect of this invention, there is provided a method of controlling operation of a multistage hydraulic machine under a steady operation condition thereof in which respective stages are connected in series through runners and return passages and the highest pressure stage connected to a spiral casing and the lowest pressure stage connected to a draft tube are provided with movable guide vanes the degrees of openings of which are variable, the method comprising the steps of controlling the degree of opening of the movable guide vanes of one of the highest and lowest pressure stages in accordance with control instructions regarding the flow amount and controlling the degree of opening of the movable guide vanes of the other one of the highest and lowest pressure stages in accordance with control instructions regarding hydraulic pressure ratio or hydraulic pressure difference between a pressure at a portion between the highest and lowest pressure stages and a pressure at a portion outside of one of the highest and lowest pressure stages.

In a further aspect of this invention, there is provided a method of controlling operation of a multistage hydraulic machine in response to change of a static head acting on the whole structure of the hydraulic machine under a steady operation condition in which respective pressure stages are connected in series through runners and return passages and the highest and lowest pressure stages are provided with movable guide vanes the degrees of openings of which are variable, the method comprising the steps of controlling the degree of opening of the movable guide vanes of one of the highest and lowest pressure stages in accordance with control instructions regarding the static head and controlling the degree of opening of the movable guide vanes of the other one of the highest and lowest pressure stages in accordance with control instructions regarding hydraulic pressure difference between a pressure at a portion between the highest and lowest pressure stages and a pressure at a portion outside of the other one of the highest and lowest pressure stages.

BRIEF DESCRIPTION OF THE DRAWINGS

In the accompanying drawings:

FIGS. 5a through 5c, FIGS. 6a through 6c, and FIGS. 7, 8 and 9 show graphs representing relationship regarding relative ratio or difference between the static head and the hydraulic pressure difference under a steady operation condition in conjunction with its prescribed range.

DESCRIPTION OF THE PREFERRED EMBODIMENTS

One embodiment of the operation control method of a multistage hydraulic machine according to this invention will be described hereunder in conjunction with FIG. 1 in which a Francis-type two-stage hydraulic machine is illustrated.

Figure 1:
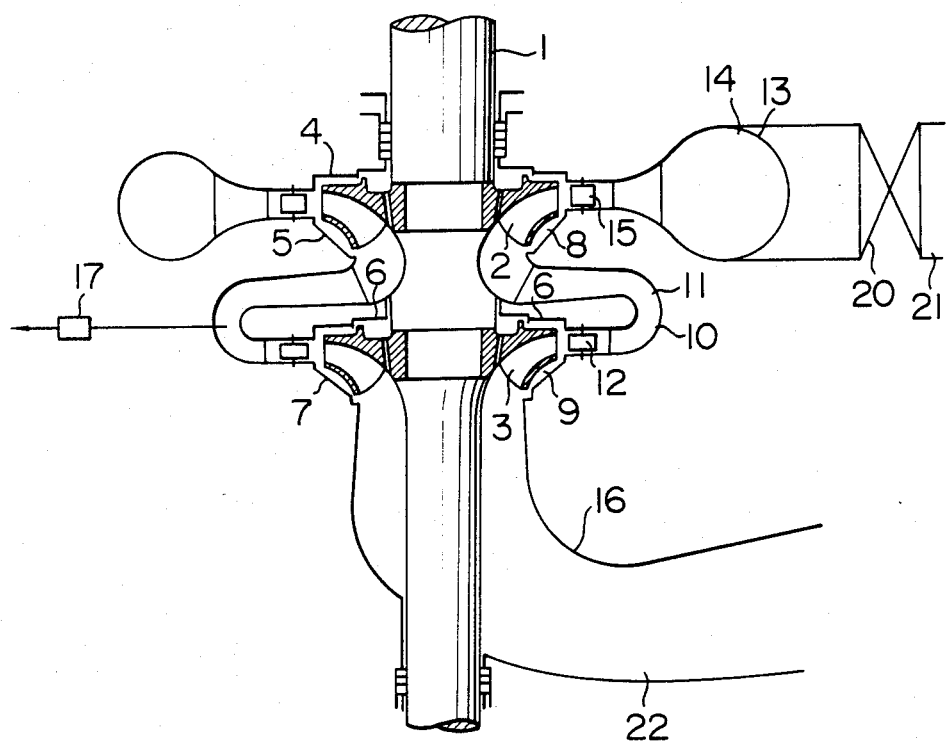
FIG. 1 and FIG. 7 are schematic longitudinal sectional views of a typical two-stage hydraulic manine to which this invention is applicable.

Referring to FIG. 1, a runner 2 at the high pressure stage and a runner 3 at the low pressure stage are mounted on a wheel shaft 1 and axially spaced. The runner 2 is covered with upper and lower covers 4 and 5 to thereby define a runner chamber 8 of the high pressure stage and the runner 3 is covered with upper and lower covers 6 and 7 to thereby define a runner chamber 9 of the low pressure stage. The runner chambers 8 and 9 are connected through a return passage 10 in which a return blades 11 is disposed and movable guide vanes 12 of the low pressure stage having variable degree of opening are also located.

Figure 2:
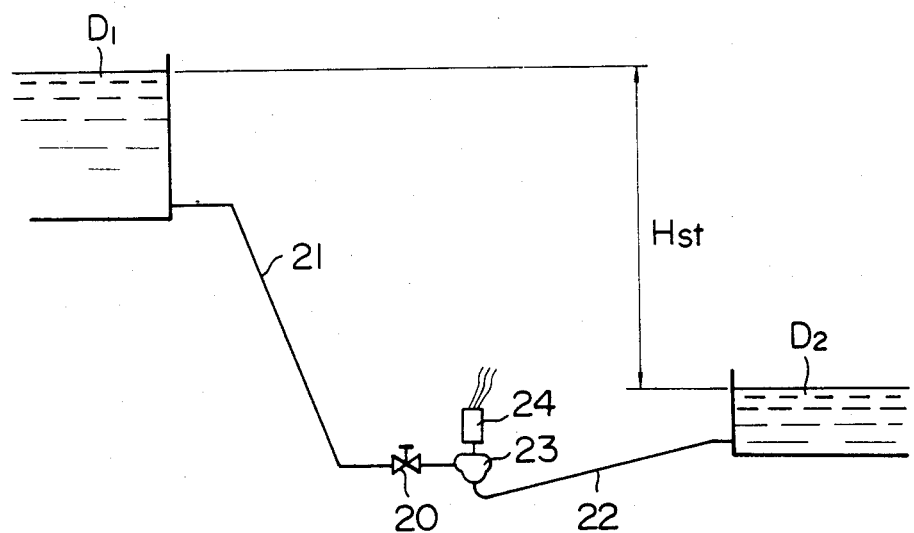
FIG. 2 is a schematic view showing a hydraulic system including the hydraulic machine shown in FIG. 1.

A spiral casing 13 is arranged outside of the runner chamber 8, which is communicated with a spiral chamber 14 of the casing 13. The inlet portion of the spiral chamber 14 is connected through an inlet valve 20 to a penstock 21 which is operatively connected to an upper dam $D_1$ (FIG. 2). On the outside of the runner 2 are arranged movable guide vanes 15 of the high pressure stage which have a variable degree of opening. The runner chamber 9 is connected to a draft tube 16 connected to a spillway 22, which is connected to a lower dam $D_2$. In FIG. 2, reference numeral 23 designates a whole structure of a two-stage hydraulic machine and reference numeral 24 designates a dynamoelectric machine connected to the hydraulic machine 23. A hydraulic pressure detecting device 17 is connected to the return passage 10 for detecting hydraulic pressure in the passage 10 between the runner chambers 8 and 9.

Figure 3A:
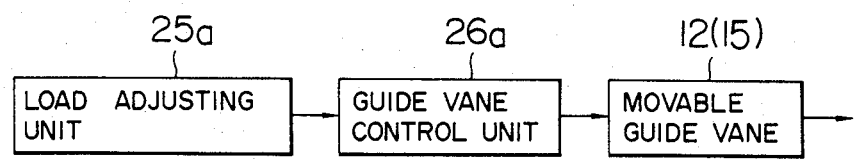
FIGS. 3a through 3c and FIGS. 4a through 4c show block diagrams for controlling the operation of movable guide vanes of the hydraulic machine under a steady operation condition by the methods according to this invention.
Figure 4C:
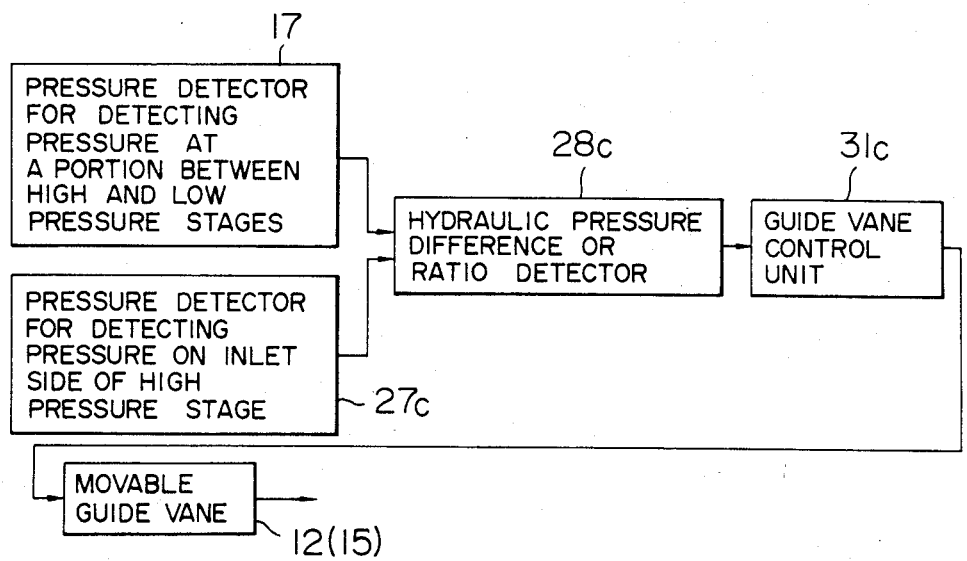
Figure 4A:
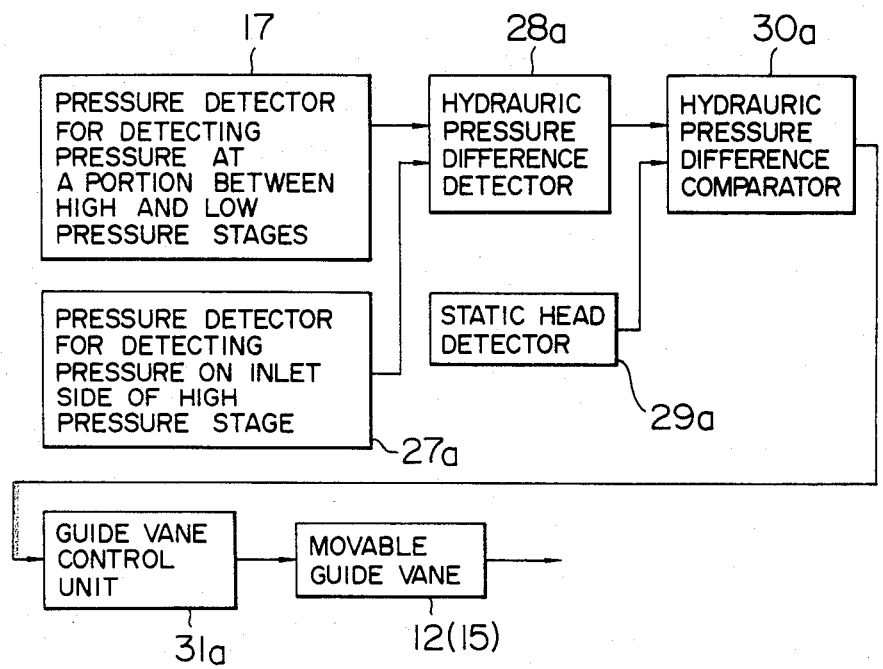

Referring to FIGS. 3a and 4a showing operation control block diagrams, when it is required to control and adjust the load at the steady operation condition, the degree of opening of the movable guide vanes 15 of the high pressure stage can be controlled by a guide vane control device 26a which is operated in response to control instructions from a load adjustment device 25a.

According to this control method of the movable guide vanes 15, the head distribution on the runners 2 and 3 of the low and high pressure stages is varied. Namely, when the degree of opening of the movable guide vanes 15 of the high (highest) pressure stage increases, the head distribution on the runner 2 relatively decreases and when the degree of opening thereof decreases, the head distribution thereon relatively increases, thus the hydraulic pressure of the water flowing in the passage 10 towards the low pressure stage being changed. During this control step, regarding the control of the movable guide vanes 12 of the low (lowest) pressure stage, the degree of opening of the movable guide vanes 12 can be controlled by a control signal regarding hydraulic pressure difference (Hd1) between the hydraulic pressure on the inlet side of the high pressure stage (for example, pressure in the penstock 21) and the hydraulic pressure at a portion between the high and low pressure stage (for example, pressure in the return passage 10) to obtain a hydraulically suitable head distribution.

Figure 5A:
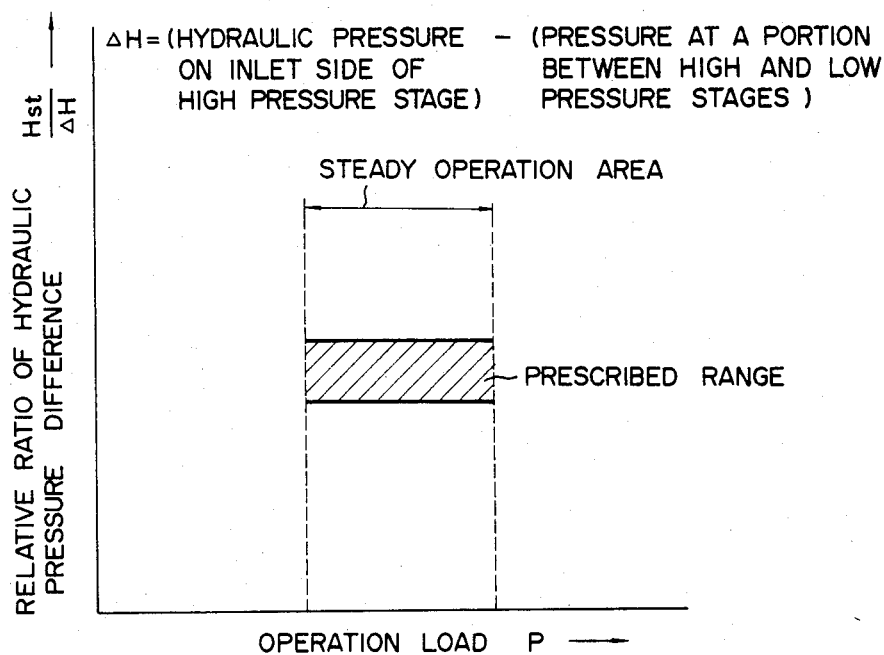
Figure 6A:
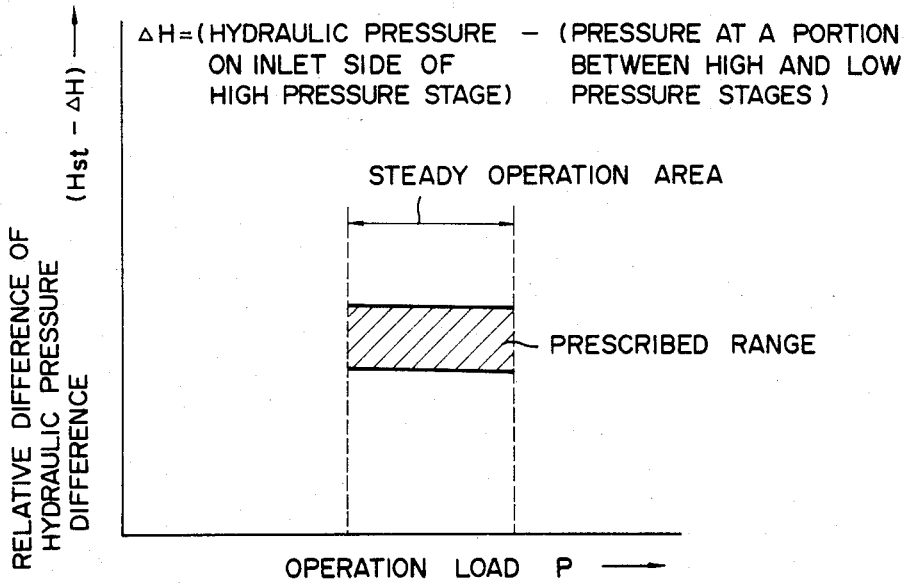

Namely, as shown in FIG. 4a as a concrete example, the hydraulic pressure difference (Hd1) between the hydraulic pressure, for example, in the penstock 21 detected by a pressure detector 27a located on the inlet side of the high pressure stage and the hydraulic pressure, for example, in the return passage 10 detected by the detector 17 described hereinbefore is detected by a hydraulic pressure difference detector 28a. The pressure difference thus detected by the detector 28a is compared with a static head acting on the whole structure of the hydraulic machine (i.e. water head Hst between the upper and lower dams $D_1$ and $D_2$) by using a hydraulic pressure difference comparator 30a. At the next step, when the relative ratio or relative difference of this pressure difference compared by the comparator 30a exceeds the prescribed range (one example is shown in FIGS. 5a and 6a)preset so as to have head distribution at which the respective stages are operated with high operation performance, in other words, when the hydraulic pressure in the return passage 10 increases and the head distribution on the runner of the low pressure stage increases, control instructions for rotating the movable guide vanes 12 of the low pressure stage in a direction to open them are transmitted to a guide vane control unit 31a. On the other hand, when the relative ratio or relative difference described above is below the prescribed range, in other words, when the hydraulic pressure in the return passage 10 decreases and the head distribution on the runner of the low pressure stage decreases, control instructions for rotating the guide vanes 12 in a direction to close them are transmitted to the guide vane control unit 31a. Thus, by the manner described above, the control of the degree of opening of the movable guide vanes 12 of the low pressure stage is continuously done until a time at which the relative ratio or relative difference comes into the prescribed range.

Thus, according to one embodiment of this invention, the multistage hydraulic machine can be operated with a predetermined load by the manner, as described above, such that the degree of opening of the movable guide vanes 15 of the high (highest) pressure stage is controlled by the control instructions on the load applied to the guide vanes 15, and at the same time, the degree of opening of the movable guide vanes 12 of the low (lowest) pressure stage is controlled by control instructions on the hydraulic pressure difference (Hd1) between the pressure at the inlet side of the high pressure stage and the pressure at a portion between the high and low pressure stage.

An operation control method for issuing load control instructions to the movable guide vanes 12 will be described hereunder.

The degree of opening of the movable guide vanes 12 of the low pressure stage is controlled by transmitting load control instructions to the guide vane control unit 26a from the load adjustment unit 25a as shown in FIG. 3a.

On the other hand, the degree of opening of the movable guide vanes 15 of the high pressure stage is controlled according to the block diagram which is shown in FIG. 4a. In this control method, when the relative ratio or relative difference of the static head compared by the comparator 30a with the hydraulic pressure difference (Hd1) exceeds the prescribed range preset so as to have head distribution at the respective pressure stages for performing high efficiency operation, the control instructions are given to the guide vane control unit 31a to close the guide vanes 15, and when the relative ratio or relative difference is below the prescribed range, the control instructions for opening the guide vanes 12 are given to the control unit 31a.

Although, in the first embodiment described above, regarding the control of the movable guide vanes 12 of the low (lowest) pressure stage, it is described that the degree of opening of the movable guide vanes 12 can be controlled by a control signal regarding hydraulic pressure difference (Hd1) between the hydraulic pressure on the inlet side of the high pressure stage and the hydraulic pressure at a portion between the high and low pressure stages to obtain a hydraulically stable head distribution, according to this invention, the degree of opening of the guide vanes 12 will also be controlled by a control signal regarding hydraulic pressure difference (Hd2) between hydraulic pressure at a portion between the high and low pressure stages (for example, pressure in the return passage 10) and hydraulic pressure at the outlet side of the low pressure stage (for example, pressure in the spillway 22) to obtain a hydraulically stable head distribution.

Figure 4B:
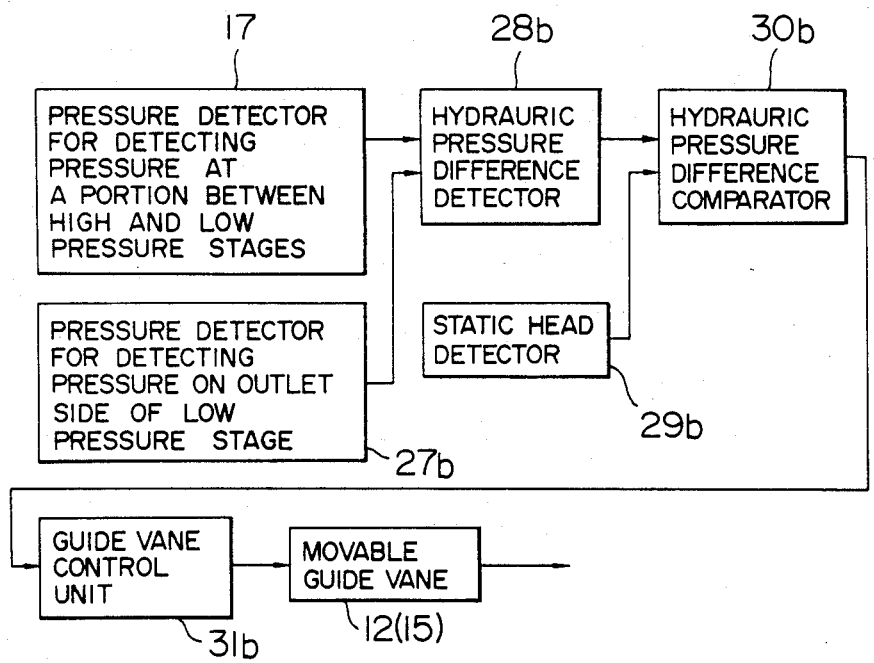
Figure 5B:
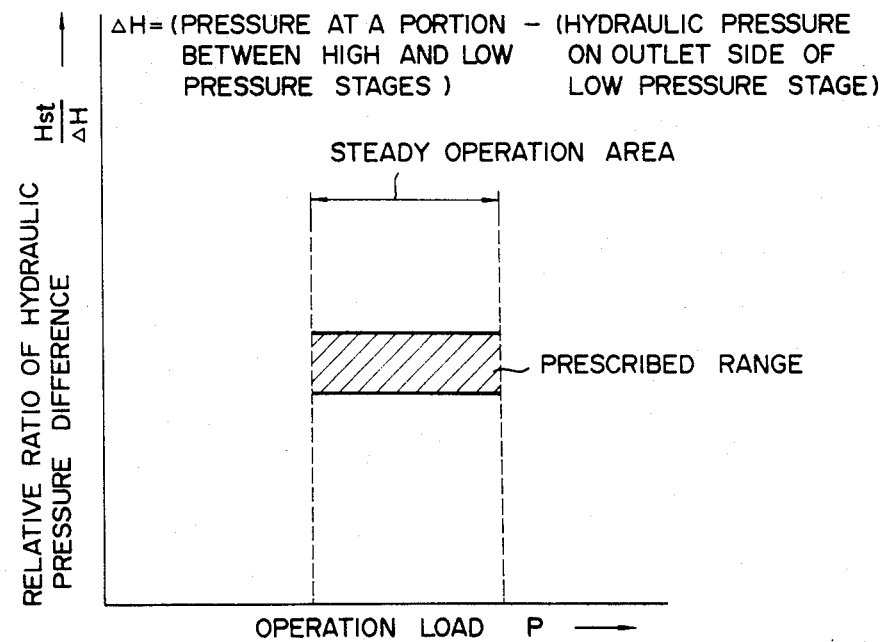
Figure 6B:
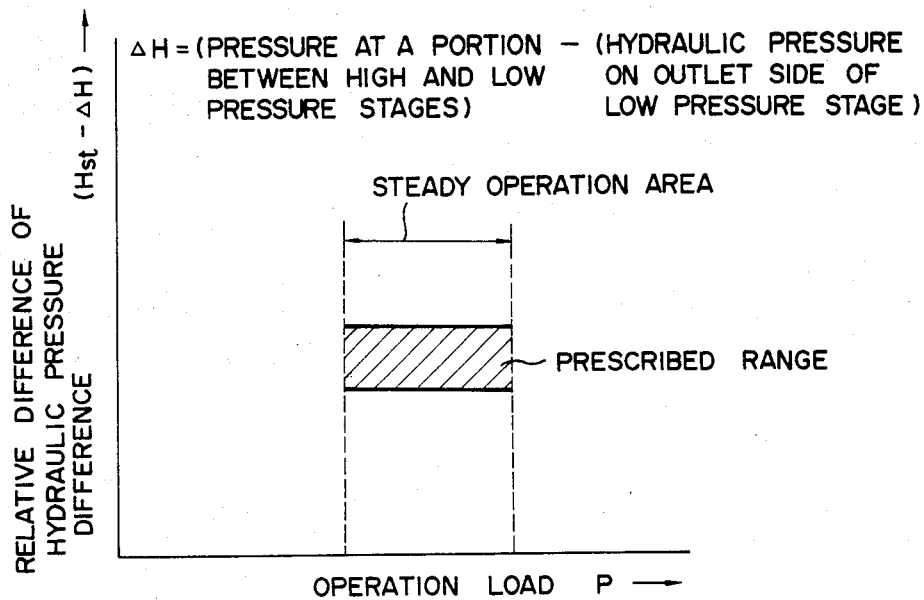
Figure 6C:
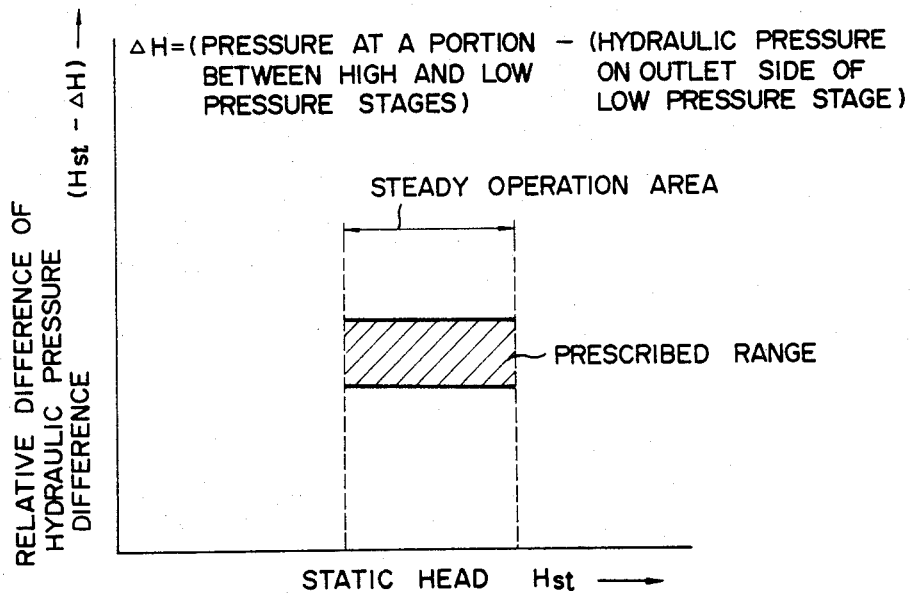

Namely, as shown in FIG. 4b as a block diagram, the hydraulic pressure difference (Hd2) between the hydraulic pressure, for example, in the return passage 10 detected by the detecting unit 17 located at the intermediate portion between the high and low pressure stages and the hydraulic pressure, for example, in the spillway 22 detected by a pressure detector 27b located on the outlet side of the low pressure stage is detected by a hydraulic pressure difference detector 28b. The pressure difference thus detected by the detector 28b is compared with a static head acting on the whole structure of the hydraulic machine (i.e. water head Hst between the upper and lower dams $D_1$ and $D_2$) by using a hydraulic pressure difference comparator 30b. At the next step, when the relative ratio or relative difference of this pressure difference compared by the comparator 30b exceeds the prescribed range (for example, shown in FIGS. 5b and 6b) preset so as to have head distribution at which the respective stages are operated with high operation performance, in other words, when the hydraulic pressure in the return passage 10 decreases and the head distribution on the runner of the low pressure stage decreases, control instructions for operating the movable guide vanes 12 are given to a guide vane control unit 31a to close the guide vanes 12. On the other hand, when the relative ratio or relative pressure difference described above is below the prescribed range, in other words, when the hydraulic pressure in the return passage 10 increases and the head distribution on the runner of the low pressure stage increases, control instructions for operating the movable guide vanes 12 are given to the control unit 31b to open the guide vanes 12. Thus, by the manner described above, the control of the degree of opening of the movable guide vanes 12 of the low pressure stage is continuously done until a time at which the relative ratio or difference comes into the prescribed range.

Thus, according to the second embodiment of this invention, the multistage hydraulic machine can be operated with a predetermined load by the manner, as described above, such that the degree of opening of the movable guide vanes 15 of the high (highest) pressure stage is controlled by load control instructions applied to the guide vanes 15, and at the same time, the degree of the opening of the movable guide vanes 12 of the low (lowest) pressure stage is controlled by control instructions on the hydraulic pressure difference (Hd2) between the pressure at a portion between the high and low pressure stages and the pressure at the outlet side of the low pressure stage.

An operation control method, in the other view point according to this embodiment, for transmitting load control instructions to the movable guide vanes 12 will be described hereunder.

Although the degree of opening of the movable guide vanes 12 of the low pressure stage is controlled by the manner as described before in conjunction with FIG. 3a, the degree of opening of the movable guide vanes 15 of the high pressure stage is controlled by the manner according to the block diagram shown in FIG. 4b. In this modified control method, when the relative ratio or relative difference of the static head compared by the comparator 30b with the hydraulic pressure difference (Hd2) exceeds the prescribed range preset so as to have head distribution at the pressure stage for performing high efficiency operation, the control instructions are given to the guide vane control unit 31b to open the guide vanes 15, and when the relative ratio or relative difference is below the prescribed range, the control instructions for closing the guide vanes 12 are given to the control unit 31b.

A further, third, embodiment of the operation control method of a multistage hydraulic machine according to this invention will be described hereunder in which the control is effected by taking the change of water level into consideration.

Figure 3B:
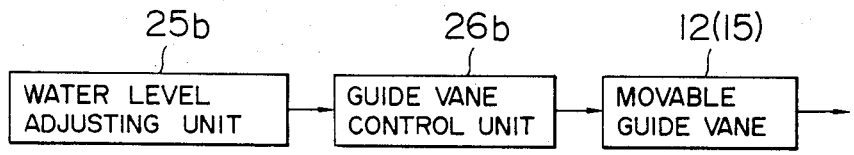

At a steady operation condition of the multistage hydraulic machine, when it is required to adjust or control water level in response to the change of the static head, the degree of opening of the movable guide vanes 15 of the high (highest) pressure stage can be controlled by a guide vane control unit 26b (FIG. 3b) with control instructions from a water level adjusting unit 25b in response to the change of the static head as shown in FIG. 3b.

Figure 5C:
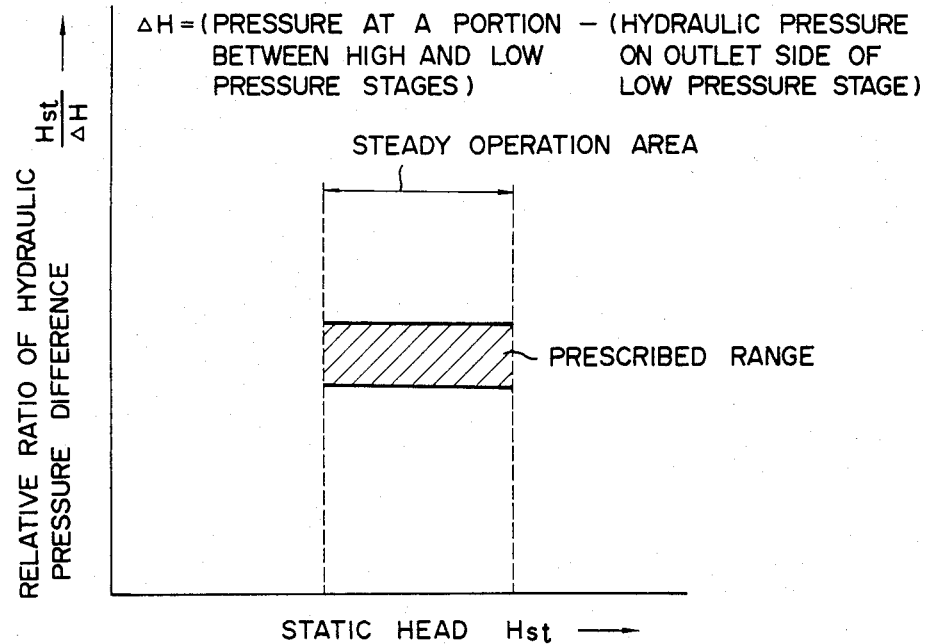

In this embodiment, the control of the movable guide vanes 12 of the low (lowest) pressure stage may be done in response to the static head by the method similar to that of the second emboidment with reference to FIGS. 5c and 5d.

As described above, according to the third embodiment of this invention, the degree of the movable guide vanes 15 of the high pressure stage is controlled by the control instructions in response to the change of the static head, and at the same time, the degree of opening of the movable guide vanes 12 of the low (lowest) pressure stage is controlled by control instructions on the hydraulic pressure difference (Hd2) between the pressure at a portion between the high and low pressure stages and the pressure at the outlet side of the low pressure stage. Thus, the multistage hydraulic machine can be effectively operated in accordance with the change of the static head.

An operation control method according to the other view point of this embodiment, control instructions from the water level adjusting unit 25b are transmitted to the guide vane control unit 26b to thereby control the degree of opening of the guide vanes 12 of the low pressure stage as shown in FIG. 4b. The control of the degree of opening of the movable guide vanes 15 of the high pressure stage can be done in accordance with the method represented by the block diagram shown in FIG. 4b. Also in this control method, when the relative ratio or relative difference of the static head compared by the comparator 30b with the hydraulic pressure difference (Hd2) exceeds the prescribed range preset so as to have head distribution at the pressure stage for performing high efficiency operation, the control instructions are given to the guide vane control unit 31b to open the guide vanes 15, and when the relative ratio or relative difference is below the prescribed range, the control instructions for closing the guide vanes 12 are given to the control unit 31b.

Furthermore, according to fourth embodiment of this invention, the degree of opening of the movable guide vanes of one of the high (highest) and low (lowest) pressure stages of the multistage hydraulic machine can be controlled by the flow amount control instructions and the degree of opening of the movable guide vanes of the other one of the high (highest) and low (lowest) pressure stages can be controlled by the load control instructions. This control mode will be described in detail hereunder.

Figure 7:
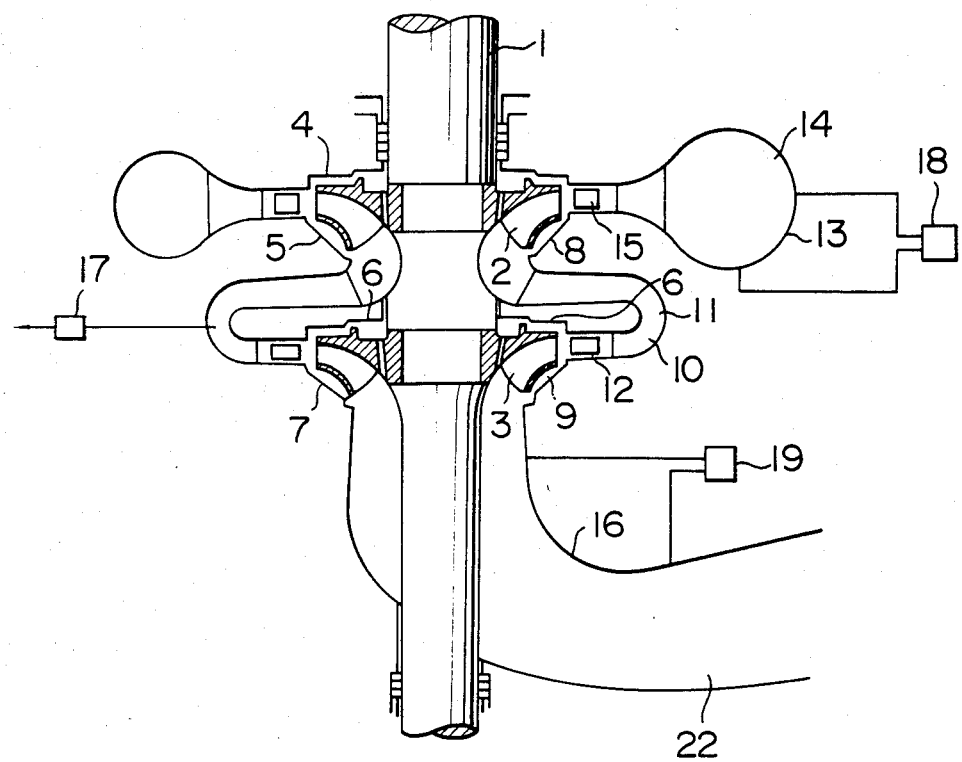

Referring to FIG. 7, in which the same reference numerals as those added to the portions shown in FIG. 1 are added to the corresponding portions, flow amount detectors 18 and 19 which operate according to an indexing method are connected to the spiral casing 13 and the draft tube 16, respectively. These flow amount detectors are of the known type in which the relative change of the flow amount is measured and detected by indicating as indexes the pressure difference between proper two points in the water flow passages.

Figure 3C:
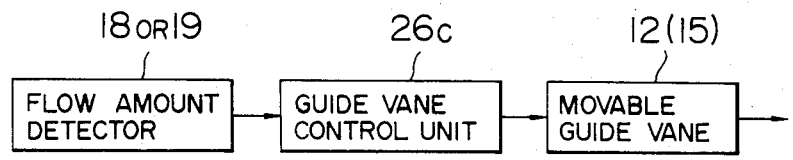
Figure 8:
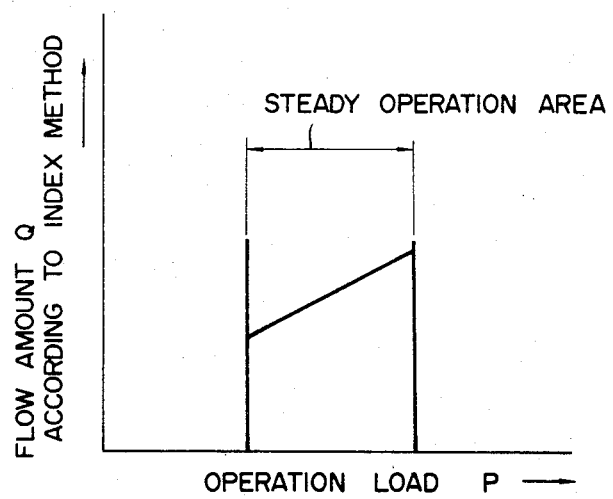

According to this embodiment for controlling the operation of a multistage, for example, two-stage hydraulic machine, in case of adjusting and controlling the load with a given operation head under a steady operation condition, control instructions of the flow amount detected by the detectors 18 and 19 are transmitted to a guide vane control unit 26c as shown in FIG. 3c to thereby control the degree of opening of the movable guide vanes 15 of the high pressure stage. Namely, the degree of opening of the movable guide vanes 15 of the high pressure stage is controlled so that the guide vanes 15 are operated in a direction to close them when the flow amounts detected by the detectors 18a and 19a exceed the flow amounts corresponding to target load predetermined by the relationship between the operation head and the load (which is shown in FIG. 8)and when the flow amounts are below the flow amounts corresponding to the target load, the guide vanes 15 are operated in a direction to open them.

In accordance with the control of the degree of opening of the movable guide vanes of the high pressure stage, the head distribution on the runners of the high and low pressure stages changes. In other words, when the degree of opening of the movable guide vanes 15 of the high pressure stage increases, the head distribution on the runner of the high pressure stage becomes relatively lower than that on the runner of the low pressure stage, and when the degree of opening of the movable guide vanes 15 decreases, the head distribution on the high pressure stage relatively increases. Thus, the hydraulic pressure in the return passage at a point between the high and low pressure stages changes.

The degree of opening of the movable guide vanes 2 of the low pressure stage can be controlled by transmitting the control signal representing the hydraulic pressure difference or ratio (Hd3) between the hydraulic pressure on the inlet side of the high pressure stage (for example, pressure in the penstock) and the hydraulic pressure at a portion between the high and low pressure stages (for example, in the return passage 10) to the control unit for controlling the movable guide vanes 12 to have hydraulically suitable head distribution.

Figure 9:
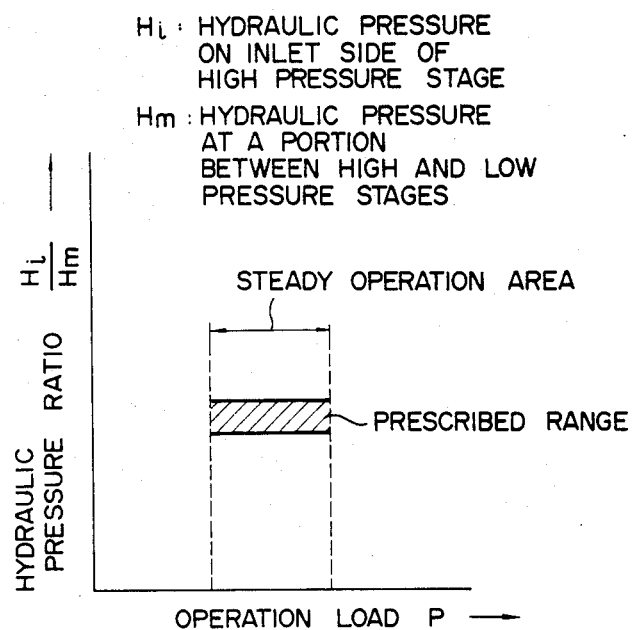
Figure 10:
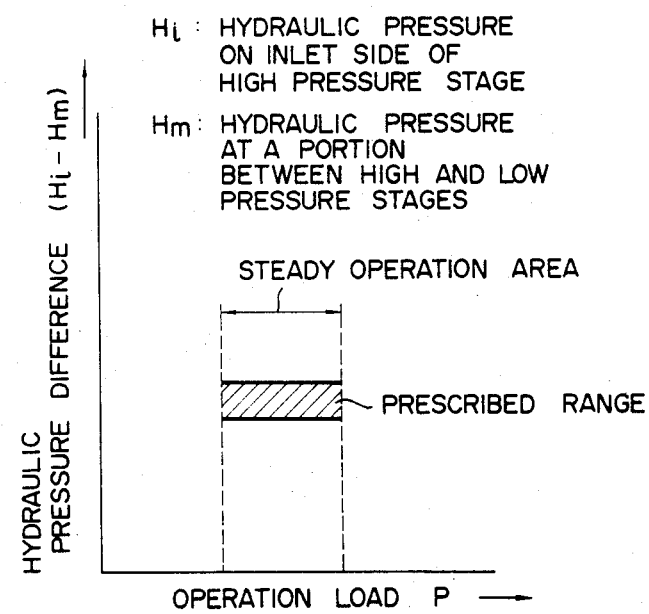

As shown in FIG. 4c as a block diagram, the hydraulic pressure difference or ratio (Hd3) between the hydraulic pressure on the inlet side of the high pressure stage detected by a detector 27c and the hydraulic pressure at a portion between the high and low pressure stages detected by a detector 17 is detected by a detector 28c. When the detected hydraulic pressure difference or ratio (Hd3) (exceeds) the prescribed range (one example is shown in FIG. 9 or 10) preset to have a head distribution for operating the respective stages with high hydraulic performance, i.e. when the hydraulic pressure at a portion between the high and low pressure stages decreases and the head distribution on the runner of the low pressure stage decreases, the movable guide vanes 12 of the low pressure stage is operated in a direction to close them. On the other hand, when the hydraulic pressure difference or ratio (Hd3) is below the prescribed range, i.e. when the hydraulic pressure at a portion between the high and low pressure stages increases and the head distribution on the runner of the low pressure stage increases, the movable guide vanes 12 are operated to open them. The control instructions for opening or closing the movable guide vanes 12 are transmitted to the guide vane control unit 31c, whereby the degree of opening of the guide vanes 12 is controlled until a time at which the hydraulic pressure difference or ratio (Hd3) will return within the prescribed range. Thus, as the degree of opening of the movable guide vanes 15 of the high pressure stage is controlled by the flow amount control instructions, the degree of opening of the movable guide vanes 12 of the low pressure stage can also be controlled by the control instructions on the hydraulic pressure difference (Hd3) to thereby effectively operate the hydraulic machine with a predetermined load.

An operation control method, according to the other view point of this fourth embodiment, in which flow amount control instructions are transmitted to the movable guide vanes 12 of the low pressure stage will be described hereunder. The degree of opening of the movable guide vanes 12 can be controlled by transmitting flow amount control instructions to the guide vane control unit 26c as shown in FIG. 3c according to such a manner as that when the flow amount detected by the detector 18 or 19 exceeds the flow amount corresponding to a target load, the guide vanes 12 are operated in a direction to close them, and on the other hand, when the detected flow amount is below the target flow amount, they are operated in a direction to open them. At this time the degree of opening of the movable guide vanes 15 of the high pressure stage is controlled as described hereinbefore in accordance with the block diagram shown in FIG. 4c. However, in this method, when the hydraulic pressure difference or ratio (Hd3) detected by the detector 28c exceeds the prescribed range preset so as to have a head distribution for high performance operation, the movable guide vanes 15 are operated in a direction to open them and when the hydraulic pressure difference or ratio (Hd3) is below the prescribed range, the movable guide vanes 12 are operated in a direction to close them. These controls of the movable guide vanes are done by the control unit 31c in accordance with control instructions.

In still further embodiment of a controlling method of a multistage hydraulic machine by using detectors according to the indexing method, the control of degree of opening of the movable guide vanes 15 of the high (highest) pressure stage can be done by the same manner as that described before with respect to the fourth embodiment, but the control of the degree of opening of the movable guide vanes 12 of the low (lowest) pressure stage will be done to obtain suitable head distribution by transmitting a control signal regarding hydraulic pressure difference (Hd4) between a pressure at a portion between the high and low pressure stages (for example, in the return passage 10) and a pressure at a portion on the outlet side of the low pressure stage (for example, in the spillway 22).

Namely, as shown in FIG. 4d as a block diagram, the hydraulic pressure difference (Hd4) between the hydraulic pressure, for example, in the return passage detected by the detector 17 located at the intermediate portion between the high and low pressure stages and the hydraulic pressure, for example, in the spillway 22 detected by a pressure detector 27d located on the outlet side of the low pressure stage is detected by a hydraulic pressure difference detector 28d. The pressure difference detected by the detector 28d is compared with a static head detected by a detector 29d and acting on the whole structure of the hydraulic machine (i.e. water head Hst between the upper and lower dams $D_1$ and $D_2$) by using a hydraulic pressure difference comparator 30d. At the next step, when the relative ratio or relative difference of this pressure difference compared by the comparator 30d exceeds the prescribed range (for example, shown in FIGS. 5b and 6b) preset so as to have head distribution at which the respective stages are operated with high operation performance, in other words, when the hydraulic pressure in the return passage decreases and the head distribution on the runner of the low pressure stage decreases, control instructions for operating the movable guide vanes 12 are given to a guide vane control unit 31d to close the guide vanes 12. On the other hand, when the relative ratio or difference described above is below the prescribed range, in other words, when the hydraulic pressure in the return passage 10 increases and the head distribution on the runner of the low pressure stage increases, control instructions for operating the movable guide vanes 12 are given to the control unit 31d to open the guide vanes 12. Thus, by the manner described above, the control of the degree of opening of the movable guide vanes 12 of the low pressure stage is done until a time at which the relative ratio or difference comes into the prescribed range.

Thus, according to this fifth embodiment of this invention, the multistage hydraulic machine can be operated with a predetermined load by the manner such that the degree of opening of the guide vanes 15 of the high (highest) pressure stage is controlled by flow amount control instructions given to the guide vanes 15, and at the same time, the degree of opening of the movable guide vanes 12 of the low (lowest) pressure stage is controlled by control instructions on the hydraulic pressure difference (Hd4) between the pressure at a portion between the high and low pressure stages and the pressure at the outlet side of the low pressure stage.

An operation control method, according to the other view point of this embodiment, in which flow amount control instructions are transmitted to the movable guide vanes of the low pressure stage will be described hereunder.

The degree of opening of the movable guide vanes 12 can be controlled by transmitting flow amount control instructions to the guide vane control unit 26c as shown in FIG. 3c according to such a manner as that when the flow amount detected by the detector 18 or 19 exceeds the flow amount corresponding to a target load, the guide vanes 12 are operated in a direction to close them, and on the other hand, when the detected flow amount is below the aimed flow amount, they are operated in a direction to open them.

The degree of opening of the movable guide vanes 15 of the high pressure stage is controlled as described hereinbefore in accordance with the block diagram shown in FIG. 4b. However, in this method, when the hydraulic pressure difference or ratio (Hd4) compared by the comparator 30d exceeds the prescribed range preset so as to have a head distribution for high performance operation, the movable guide vanes 15 are operated in a direction to open them and when the hydraulic pressure difference or ratio (Hd4) is below the prescribed range, the movable guide vanes 12 are operated in a direction to close them. These controls of the movable guide vanes are done by the control unit 32d in accordance with the control instructions.

According to this invention as described hereinbefore, in case of controlling and adjusting load or water level in a multistage hydraulic machine under the steady operation condition, since the degree of opening of movable guide vanes of one of high (highest) and low (lowest) pressure stages can be controlled in accordance with the control or change of the degree of opening of movable guide vanes of the other pressure stage, the most hydraulically suitable combination of degrees of openings of the movable guide vanes can be selected to thereby operate the multistage hydraulic machine with an excellent hydraulic performance.

In addition, although adverse phenomena such as cavitations and swirl are generally likely caused at a runner portion of the low pressure stage, since the head distribution on the respective pressure stages can always be controlled, these adverse phenomena can be avoided by adjusting relative pressure difference or ratio between the static pressure and the hydraulic pressure difference between the pressure on the inlet side of the high pressure stage or on the outlet side of the low pressure stage and the pressure at a portion between the high and low pressure stages so that this relative difference or ratio comes into the prescribed range for operating the hydraulic machine with high hydraulic performance.

Moreover, although there may sometimes cause abnormal transient pressure rising at the low pressure stage in some combination of the degrees of openings of the movable guide vanes of the high and low pressure stages, according to this invention since the movable guide vanes are controlled under the observation of the hydraulic pressure at a portion between the high and low pressure stages, the abnormal pressure rising can be detected and prevented.

Thus, according to the methods for controlling load and water level of multistage hydraulic machines of this invention, the hydraulic machines can always be operated with high and reliable hydraulic performance.

We claim:

1. A method of controlling operation of a multistage hydraulic machine in load adjustment under a steady operation condition thereof in which respective pressure stages are connected in series through runners and return passages and highest and lowest pressure stages are provided at inlet portions thereof with movable guide vanes, a degree of openings of which are variable, said method comprising the steps of controlling the degree of opening of the movable guide vanes of one of said highest and lowest pressure stages in accordance with predetermined control instructions and controlling the degree of opening of the movable guide vanes of the other one of said highest and lowest pressure stages in accordance with control instructions comprising at least one of a hydraulic pressure ratio of a hydraulic pressure at a portion on an inlet side of said highest and lowest pressure stage to a hydraulic pressure at a portion between said highest and lowest pressure stages, a hydraulic pressure difference between a hydraulic pressure at a portion on an inlet side of said highest pressure stage and a hydraulic pressure at a portion between said highest and lowest pressure stages, and a hydraulic pressure difference between a hydraulic pressure at a portion on an outlet side of said lowest pressure stage and a hydraulic pressure at a portion between said highest and lowest pressure stages.

2. The method according to claim 1, wherein said predetermined control instructions relate to the load, and the degree of opening of the movable guide vanes of said other one of the highest and lowest pressure stages is controlled in accordance with control instructions regarding hydraulic pressure difference between a pressure at a portion between said highest and lowest pressure stages and a pressure at a portion outside of one of said highest and lowest pressure stages.

3. The method according to claim 2 wherein said one of said highest and lowest pressure stages is the highest pressure stage and said portion outside of one of said highest and lowest pressure stages is a portion on an inlet side of said highest pressure stage.

4. The method according to claim 2 wherein said one of said highest and lowest pressure stages is the highest pressure stage and said portion outside of one of said highest and lowest pressure stages is a portion on an outlet side of said lowest pressure stage.

5. The method according to claim 2 wherein said one of said highest and lowest pressure stage is the lowest pressure stage and said portion outside of one of said highest and lowest pressure stages is a portion on an inlet side of said highest pressure stage.

6. The method according to claim 2 wherein said one of said highest and lowest pressure stages is the lowest pressure stage and said portion outside of one of said highest and lowest pressure stages is a portion on an outlet side of said lowest pressure stage.

7. The method according to claim 3 wherein when relative ratio or relative difference between said hydraulic pressure difference and a static head acting on the whole structure of the hydraulic machine exceeds a prescribed range thereof, the movable guide vanes of said lowest pressure stage is operated in a direction to open them and when said relative ratio or relative difference is below the prescribed range, the movable guide vanes of said lowest pressure stage is operated in a direction to close them to thereby control and adjust the load of the multistage hydraulic machine.

8. The method according to claim 4 wherein when relative ratio or relative difference between said hydraulic pressure difference and a static head acting on the whole structure of the hydraulic machine exceeds a prescribed range thereof, the movable guide vanes of said lowest pressure stage is operated in a direction to close them and when said relative ratio or relative difference is below the prescribed range, the movable guide vanes of said lowest pressure stage is operated in a direction to open them to thereby control and adjust the load of the multistage hydraulic machine.

9. The method according to claim 5 wherein when relative ratio or relative difference between said hydraulic pressure difference and a static head acting on the whole structure of the hydraulic machine exceeds a prescribed range thereof, the movable guide vanes of said highest pressure stage is operated in a direction to close them and when said relative ratio or relative difference is below the prescribed range, the movable guide vanes of said highest pressure stage is operated in a direction to open them to thereby control and adjust the load of the multistage hydraulic machine.

10. The method according to claim 6 wherein when relative ratio or relative difference between said hydraulic pressure difference and a static head acting on the whole structure of the hydraulic machine exceeds a prescribed range thereof, the movable guide vanes of said highest pressure stage is operated in a direction to open them and when said relative ratio or relative difference is below the prescribed range, the movable guide vanes of said highest pressure stage is operated in a direction to open them to thereby control and adjust the load of the multistage hydraulic machine.

11. The method according to claim 1, wherein said predetermined control instructions relate to the flow amount, and the degree of opening of the movable guide vanes of said other one of the highest and the lowest pressure stages is controlled in accordance with control instructions comprising at least one of a hydraulic pressure ratio and a difference between a pressure at a portion between said highest and lowest pressure stages and a pressure at a portion outside of one of said highest and lowest pressure stages.

12. The method according to claim 11 wherein said portion outside of one of said highest and lowest pressure stages is a portion on an inlet side of said highest pressure stage.

13. The method according to claim 11 wherein said portion outside of one of said highest and lowest pressure stages is a portion on an outlet side of said lowest pressure stage.

14. The method according to claim 12 wherein flow amount detectors which operate according to an index method are located at one of said spiral casing and said draft tube and control instructions regarding flow amount detected by selected one of said detectors are given to the movable guide vanes of said highest pressure stage so that the movable guide vanes of said highest pressure stage are operated in a direction to close them when said detected flow amount exceeds the flow amount corresponding to a target load and operated in a direction to open them when said detected flow amount is below the flow amount corresponding to the target load, and at the same time, control instructions regarding said hydraulic pressure ratio or difference are given to the movable guide vanes of said lowest pressure stage so that the movable guide vanes of said lowest pressure stage is operated to close them when said hydraulic pressure ratio or difference exceeds a prescribed range thereof and to open them when said hydraulic pressure ratio or difference is below the prescribed range so as to maintain said hydraulic pressure ratio or difference within said prescribed range.

15. The method according to claim 12 wherein flow amount detectors which operate according to an index method are located at one of said spiral casing and said draft tube and control instructions regarding flow amount detected by selected one of said detectors are given to the movable guide vanes of said lowest pressure stage so that the movable guide vanes of said lowest pressure stage are operated in a direction to close them when said detected flow amount exceeds the flow amount corresponding to a target load and operated in a direction to open them when said detected flow amount is below the flow amount corresponding to the target load, and at the same time, control instructions regarding said hydraulic pressure ratio or difference are given to the movable guide vanes of said highest pressure stage so that the movable guide vanes of said highest pressure stage is operated to open them when said hydraulic pressure ratio or difference exceeds a prescribed range thereof and to close them when said hydraulic pressure ratio or difference is below the prescribed range so as to maintain said hydraulic pressure ratio or difference within said prescribed range.

16. The method according to claim 13 wherein flow amount detectors which operate according to an index method are located at one of said spiral casing and said draft tube and control instructions regarding flow amount detected by selected one of said detectors are given to the movable guide vanes of said highest pressure stage so that the movable guide vanes of said highest pressure stage are operated in a direction to close them when said detected flow amount exceeds the flow amount corresponding to a target load and operated in a direction to open them when said detected flow amount corresponding to the target load, and at the same time, control instructions regarding relative ratio or relative difference between said hydraulic pressure difference and a static head acting on the whole structure of the hydraulic machine are given to the movable guide vanes of said lowest pressure stage so that the movable guide vanes of said lowest pressure stage are operated in a direction to close them when said relative ratio or relative difference exceeds a prescribed range thereof and to open them when said relative ratio or relative difference is below the prescribed range so as to maintain said relative ratio or relative difference within said prescribed range.

17. The method according to claim 13 wherein flow amount detectors which operate according to an index method are located at one of said spiral casing and said draft tube and control instructions regarding flow amount detected by selected one of said detectors are given to the movable guide vanes of said lowest pressure stage so that the movable guide vanes of said lowest pressure stage are operated in a direction to close them when said detected flow amount is beyond the flow amount corresponding to a target load and operated in a direction to open them when said detected flow amount corresponding to the target load, and at the same time, control instructions regarding relative ratio or relative difference between said hydraulic pressure difference and a static head acting on the whole structure of the hydraulic machine are given to said movable guide vanes of said highest pressure state so that the movable guide vanes of said highest pressure stage are operated in a direction to open them when said relative ratio or relative difference exceeds a prescribed range thereof and to close them when said relative ratio or relative difference is below the prescribed range so as to maintain said relative ratio or relative difference within said prescribed range.

18. The method according to claim 1, wherein said predetermined control instructions relate to the static head, and the degree of opening of the movable guide vanes of the other one of the highest and lowest pressure stages is controlled in accordance with control instructions regarding hydraulic pressure difference between a pressure at a portion between said one of said highest and lowest pressure stages and a pressure at a portion outside of said other one of said highest and lowest pressure stages.

19. The method according to claim 18 wherein said one of said highest and lowest pressure stages is the highest pressure stage and said portion outside of the other one of said highest and lowest pressure stages is a portion on an outlet side of the lowest pressure stage.

20. The method according to claim 18 wherein said one of said highest and lowest pressure stages is the lowest pressure stage and said portion outside of the other one of said highest and lowest pressure stages is a portion on an inlet side of said highest pressure stage. lowest pressure stage and said portion outside of the other one of said highest and lowest pressure stages is a portion on an inlet side of said highest pressure stage.

21. The method according to claim 19 wherein the movable guide vanes of said lowest pressure stage is operated in a direction to close them when said relative ratio or difference exceeds said prescribed range and operated in a direction to open them when said relative ratio or difference is below said prescribed range.

22. The method according to claim 20 wherein the movable guide vanes of said highest pressure stage is operated in a direction to open them when said relative ratio or difference exceeds said prescribed range and operated in a direction to close them when said relative ratio or difference is below said prescribed range.

* * * * *